United States Patent [19]

Kountz et al.

[11] Patent Number: 4,546,618
[45] Date of Patent: Oct. 15, 1985

[54] CAPACITY CONTROL SYSTEMS FOR INVERTER-DRIVEN CENTRIFUGAL COMPRESSOR BASED WATER CHILLERS

[75] Inventors: Kenneth J. Kountz, Palatine, Ill.; Richard A. Erth, York, Pa.

[73] Assignee: Borg-Warner Corporation, Chicago, Ill.

[21] Appl. No.: 652,401

[22] Filed: Sep. 20, 1984

[51] Int. Cl.⁴ ............... F25B 1/00; F04B 49/00
[52] U.S. Cl. ...................... 62/201; 62/209; 62/228.3; 417/20
[58] Field of Search ............. 62/228.5, 228.3, 228.4, 62/209, 217, 201; 417/20, 19

[56] References Cited

U.S. PATENT DOCUMENTS

| | | | |
|---|---|---|---|
| 4,151,725 | 5/1979 | Kountz et al. | 62/182 |
| 4,156,578 | 5/1979 | Agar et al. | 417/28 X |
| 4,259,845 | 4/1981 | Norbeck | 62/209 |
| 4,282,719 | 8/1981 | Kountz et al. | 62/115 |

Primary Examiner—William E. Wayner
Attorney, Agent, or Firm—James J. Jennings, Jr.

[57] ABSTRACT

A capacity control system for a refrigeration system including a compressor, a condensor, and an evaporator, all connected in a closed refrigeration circuit is provided. The compressor includes a plurality of adjustable inlet guide vanes, a motor connected to regulate the inlet guide vanes position, and an electrical speed motor connected to drive the compressor. The capacity control system includes a microprocessor responsive to continual measurements of a PRV signal, a compressor head signal and a suction flow signal for calculating a current operating point. The microprocessor determines whether the operating point is sufficiently away from a surge surface. The microprocessor will cause the operating point to move to a new operating point of a lower compressor speed and a more open PRV position if the operating point is sufficiently away from surge. In order to accomplish this, the microprocessor generates control signals to adjust both the speed of the compressor drive motor and the position of the inlet guide vanes. In an alternate embodiment, the microprocessor is responsive to continual measurements of a PRV signal, a motor speed signal, and a suction flow signal for generating such control signals.

20 Claims, 6 Drawing Figures

CAPACITY CONTROL SYSTEMS FOR INVERTER-DRIVEN CENTRIFUGAL COMPRESSOR BASED WATER CHILLERS

BACKGROUND OF THE INVENTION

1. Field of the Invention

This invention relates generally to refrigeration systems and more particularly, it relates to capacity control systems for inverter-driven centrifugal compressor based water chillers wherein adjustable inlet guide vanes and compressor speed are both regulated in response to a measurement of suction flow to realize a more effective and efficient operating point along an optimum control path.

2. Description of the Prior Art

A prior art search directed to the subject matter of this application in the U.S. Patent and Trademark Office revealed the following U.S. Pat. Nos.:

2,983,111
3,174,298
3,248,896
3,355,906
3,522,711
3,633,073
3,780,532
4,142,838
4,156,578

The present invention is an improvement of U.S. Pat. No. 4,151,725 entitled "Control System for Regulating Large Capacity Machinery" which issued on May 1, 1979, and U.S. Pat. No. 4,282,719 also entitled "Control System for Regulating Large Capacity Rotating Machinery" which issued on Aug. 11, 1981. Both of these patents are assigned to the same assignee as this application. In the '725 Patent, the compressor head value was inferred from the difference from the temperature of the saturated refrigerant vapor leaving the evaporator and the temperature of liquid refrigerant leaving the condenser. This temperature difference was utilized with the control system to regulate both the means for adjusting the position of the guide vanes and the means for driving the compressor. However, the assumed linearity of the function between the isentropic compressor head parameter $\Omega$ and the difference between the condensing and evaporating refrigerant temperatures did not appear to be entirely accurate over the system operation at light loads and at low heads.

In the '719 Patent, there was provided an improvement over earlier U.S. Pat. No. 4,151,725 by recognizing that a more accurate indication of a compressor head at light loads and low heads could be determined by a signal which is a function of the expression $(P_{cd} - P_{ev})/P_{ev}$. The numerator of this ratio is derived from the difference between the condensor absolute pressure $P_{cd}$ and the evaporator absolute pressure $P_{ev}$. The denominator of this ratio signal is derived from the evaporator absolute pressure $P_{ev}$.

The present invention uses the inlet guide vanes position signal referred to as PRV or pre-rotational vanes signal taken from the electrical signal on line 62 of the '725 Patent and the absolute pressure signals in the condenser and in the evaporator taken from the transducers 110, 112 on respective lines 111, 113 of the '719 Patent. The substantial improvement of the present invention depends in part upon the addition of sensing a suction flow signal. With the continual measurements of the PRV signal, compressor head signal, and suction flow signal, the present invention includes a microprocessor responsive to these measurements to calculate an initial operating point. If this operating point is determined to be sufficiently away from a surge surface as generated from the microprocessor containing pre-stored surge surface equations, the microprocessor will cause the operating point to move to a new one of a lower compressor speed and a more open PRV position.

In another embodiment of the present invention, a compressor head signal is replaced with an actual motor speed signal of the compressor. Thus, the microprocessor uses the continual measurements of the PRV signal, motor speed signal and suction flow signal to calculate the initial operating point as well as determining whether there is a more optimum operating point of a lower compressor speed and a more open vane position as was previously described above.

SUMMARY OF THE INVENTION

Accordingly, it is a general object of the present invention to provide an improved capacity control system for a refrigeration system wherein the compressor speed and guide vanes position are adjusted to an efficient and effective operating point but avoids a surge condition.

It is an object of the present invention to provide a capacity control system which includes a microprocessor responsive to certain quantities readily measurable in existing refrigeration systems for generating control signals to regulate both the speed of the compressor drive motor and the position of the inlet guide vanes in an energy-conservation manner while avoiding surge.

It is another object of the present invention to provide a capacity control system for a refrigeration system which includes a microprocessor responsive to continual measurements of a PRV signal, a compressor head signal, and a suction flow signal to calculate an initial operating point.

It is still another object of the present invention to provide a capacity control system for a refrigeration system which includes a microprocessor responsive to the continual measurements of a PRV signal, a compressor motor speed signal, and a suction flow signal to calculate an initial operating point.

In accordance with these aims and objectives of the present invention, there is provided a capacity control system for a refrigeration system which includes a compressor, a condenser and an evaporator, all connected in a closed refrigeration circuit. The compressor has a plurality of adjustable inlet guide vanes, a motor connected to regulate the inlet guide vanes position, and an electrical speed motor connected to drive the compressor. The capacity control system includes means for sensing the absolute condenser pressure to generate a first signal and means for sensing the absolute evaporator pressure to generate a second signal. There is also provided means for sensing the physical position of the inlet guide vanes to generate a third signal and means for sensing the temperature of the chilled water discharged from the evaporator to generate a fourth signal. Means for sensing a temperature set point is provided to generate a fifth signal. Means for sensing the differential pressure across an orifice plate in a suction duct is provided to generate a sixth signal. There is further provided a means for sensing the temperature of the refrigerant vapor leaving the evaporator to generate a seventh signal. A microprocessor responsive to the first through the seventh signals generates control signals to regulate both the speed of the compressor drive motor and the position of the inlet guide vanes in an energy-conservation manner while avoiding surge.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
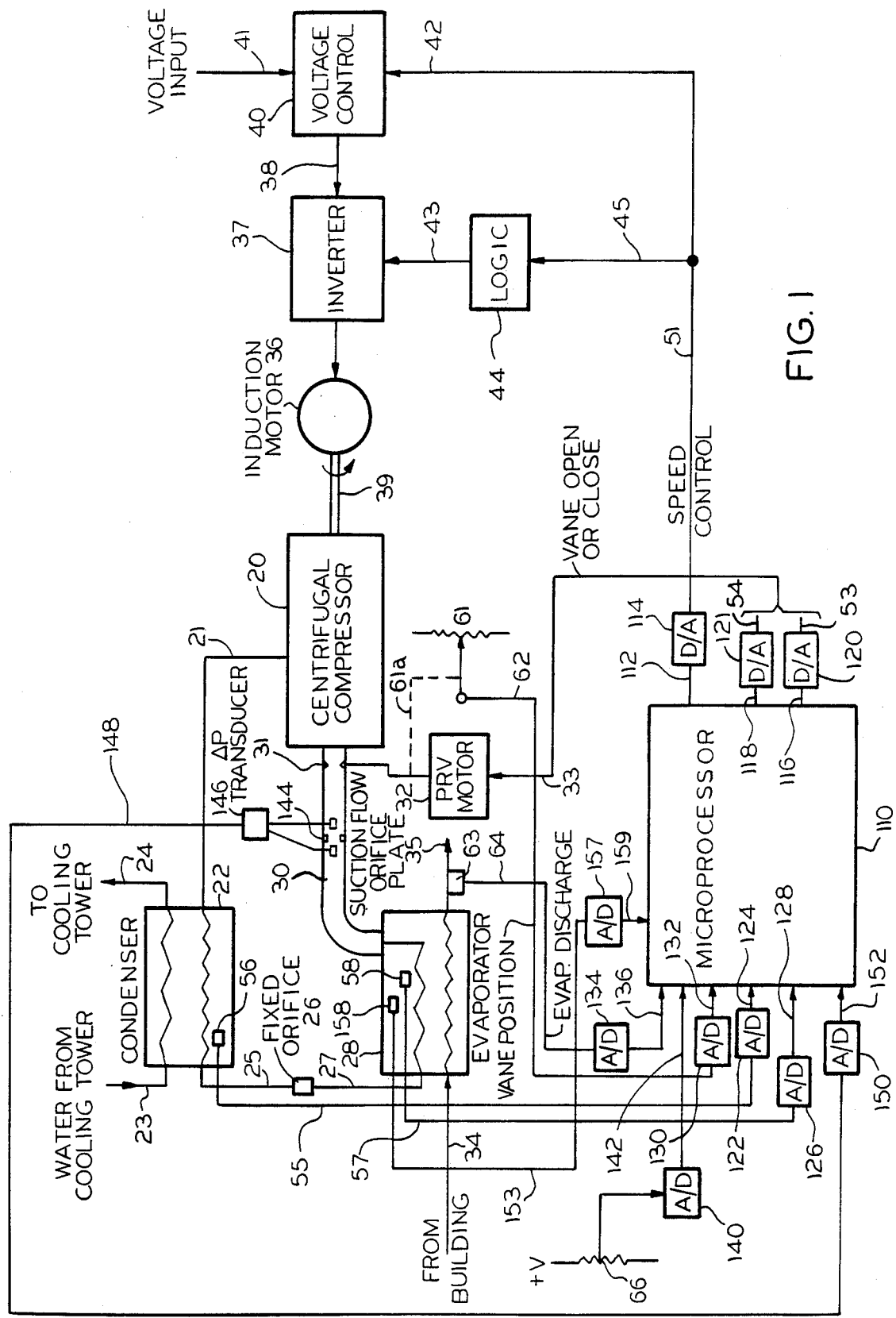
FIG. 1 is a block diagram of a capacity control system of the present invention which includes a microprocessor.

Referring now in detail to the various views of the drawings, there is shown in FIG. 1 in block diagram form a refrigeration or cooling system which includes a centrifugal compressor 20 for passing refrigerant through line 21 to a condenser 22. Water from a cooling power (not shown) enters on line 23 and leaves on line 24, the water being in heat exchange relationship with the liquid refrigerant in the condenser 22. A refrigerant at the discharged side of the condenser 22 is delivered to a fixed orifice 26 via line 25. The outlet of the orifice 26 is passed over line 27 to the refrigerant inlet connection of an evaporator 28. The refrigerant is then passed through the evaporator and out a suction duct 30 having a plurality of inlet guide vanes 31 or pre-rotational vanes (PRV). The position of the guide vanes 31 is regulated by a small PRV motor 32 which receives a control signal on line 33. The higher temperature of water from a building or cooling load (not shown) enters on line 34 and leaves as chilled water on line 35, the building water being in heat exchange relationship with the refrigerant vapor in the evaporator 28.

An electrical prime mover such as an induction motor 36 is coupled over a shaft 37 for driving the centrifugal compressor 20. The motor 36 is in turn driven from an inverter 37 which receives a DC input voltage over line 38 so as to determine the amplitude of the inverter output voltage. A voltage control circuit 40 is provided between a voltage supply line 41 and the line 38 which delivers the DC input voltage to the inverter 37. The frequency of the inverter output voltage is regulated by the periodicity of timing or gating signals appearing on line 43 from a logic circuit 44. As is well known, a regulating input signal through the logic circuit 44 on line 45 may be a DC voltage for controlling a voltage-controlled oscillator in the logic circuit to provide output pulses at a frequency determined by the amplitude of the signal on line 45. The logic circuit generally includes a ring counter-type circuit to distribute the pulses to the switching means such as thyristors in the inverter 37.

As described thus far, the components of the present refrigeration system is quite conventional in nature and are the same components as shown in FIG. 1 of U.S. Pat. No. 4,151,725, which is hereby incorporated by reference. The substantial improvement of the present invention depends in part on the provision of a microprocessor 110 which is utilized to regulate both the speed of the induction motor 36 via line 51 and the physical position of the pre-rotational vanes 31 via line 33 in an energy-conservation manner so as to obtain an optimum operating point while avoiding compressor surge. The vane control signal on line 33 can be either an "open vanes" signal on line 53 or a "close vanes" signal on line 54, or no signal ("hold vanes"). As can be seen, the output speed control signal from the microprocessor 110 on line 112 is fed through a digital-to-analog (D/A) converter 114 for supplying the line 51. The vane position control signals from the microprocessor 110 on lines 116 and 118 are fed through respective D/A converters 120 and 121 for supplying the respective lines 53 and 54. These output control signals are derived from various input signals which will now be described.

A first input signal on line 55 is provided by a first compresser transducer 56 and is a function of the absolute pressure in the condenser 22. A second input signal on line 57 is obtained from a second pressure transducer 58 and is a function of the absolute pressure in the evaporator 28. The first input signal is fed through analog-to-digital (A/D) converter 122 for driving the microprocessor 110 via line 124. A second input signal is fed through A/D converter 126 for driving the microprocessor 110 via line 128. The pressure transducer 56, 58 are the same type as pressure tranducers 110 and 112 described in FIG. 1 of U.S. Pat. No. 4,282,719 which is hereby incorporated by reference.

A third input signal on line 62 is provided by a potentiometer 61 with its movable arm or wiper mechanically coupled to the output shaft of the PRV motor 32 as indicated by dotted lines 61a. Therefore, this third input signal indicates the physical position (i.e., wide open vanes-WOV, ¾ open ½ open and so forth) of the inlet guide vanes 31 in a continuous manner. The third signal is fed through A/D converter 130 for driving the microprocessor 110 via line 132. A fourth input signal on line 64 is obtained from a thermistor 63 positioned to sense the temperature of the chilled water discharged from the evaporator 28. This fourth signal represents the instantaneous load condition and is fed through A/D converter 134 for driving the microprocessor 110 via line 136. A fifth input signal on line 138 is obtained from a potentiometer 66 and represents a temperature set point or desired condition signal. This fifth signal is fed through A/D converter 140 to the microprocessor 110 via line 142.

An orifice plate 144 is provided in the suction duct 30 upstream of the pre-rotational vanes 31, and a differential pressure transducer 146 is operatively connected across the orifice plate 144 to generate a suction flow signal on line 148. The flow signal defines a sixth input signal and is fed through A/D converter 150 to the microprocessor 110 via line 152. A seventh input signal on line 153 is provided by a thermistor 155 to sense the temperature of the saturated refrigerant vapor leaving the evaporator 28. This seventh input signal is fed through A/D converter 157 to the microprocessor on 110 via 159.

Figure 3:
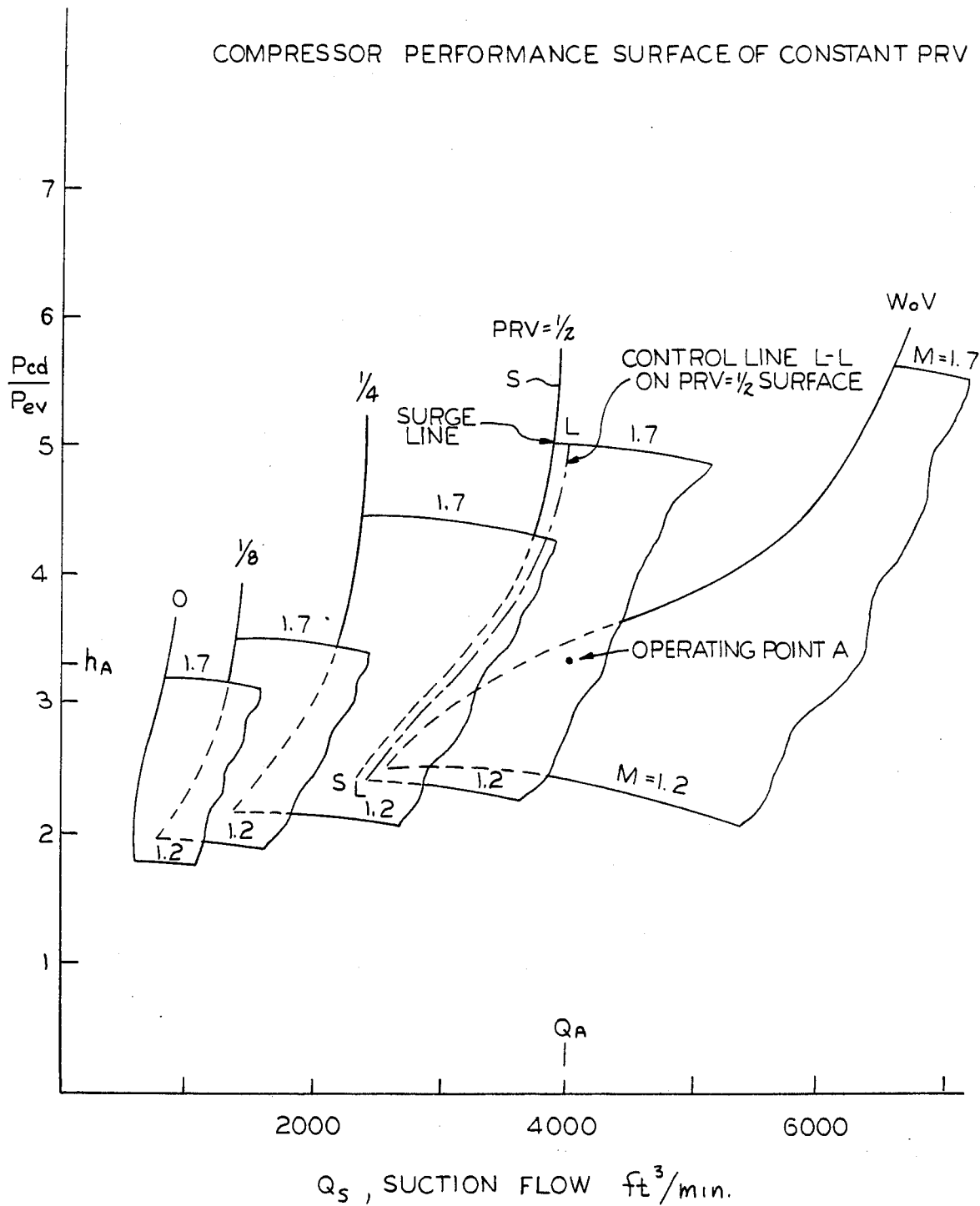
FIG. 3 is a graphical illustration useful in understanding the operation of the present invention in FIGS. 1 and 2.

In order to provide an understanding of the operation of the present invention, reference is now made to FIG. 3 of the drawings which illustrate graphically how surfaces of constant PRV settings appear on a chart where the compressor head, approximated by the pressure ratio $P_{cd}/P_{ev}$, is plotted along the left ordinate and the suction flow rate $Q_s$ is plotted along the abcissa. For example, if the compressor head is equal to $h_a$, the suction flow rate is equal to $Q_a$, and the PRV are ½ open, there is defined a particular operation point A. It should be understood that for any constant PRV surface there exist both a surge line and a control line which defines a "safe" distance away from the surge line. In the PRV equal to ½ surface, the control line is designated as L—L and the surge line is designated as S—S. The microprocessor maintains in its memory a chart of FIG. 3 as pre-stored surface equations and calculates from the input signals a current operating point and determines whether the operating point is sufficiently away from the surge surface. In this illustration, the microprocessor will determine that the operating point A is to the right of the control line L—L in FIG. 3. This would indicate that a new or more optimum operating point exists where there is the same head and same flow rate at a lower compressor speed and a more open vane position. This combination of lower speed and more open vanes will consume less energy.

To obtain this alternate speed and vane position combination, the microprocessor will lower incrementally the compressor speed such as by ¼ hz. Then, the chilled water temperature control loop is closed by moving of the PRV until the error in the water temperature is within 0.15° F. At this new speed and vane position combination, the microprocessor will determine if this new operating point is again to the right of the applicable control line. If it is, another incremental speed reduction of ¼ hz would be made.

This process is continually repeated until the operating point is determined by the microprocessor to be to the left of the applicable control line. Then, the compressor speed would be incrementally increased by ¼ hz, and the process is suspended for a certain period of time, such as 30 minutes or until the PRV or flow changes by 10% of their previous values.

If a current operating point is found to be to the right of an applicable control line with vanes being wide open (WOV), the process would be discontinued. In this region of WOV, the compressor speed is controlled by the water temperature error as determined by the temperature set point (potentiometer 66). The compressor speed will assume whatever is needed to bring the temperature error to zero.

Figure 2:
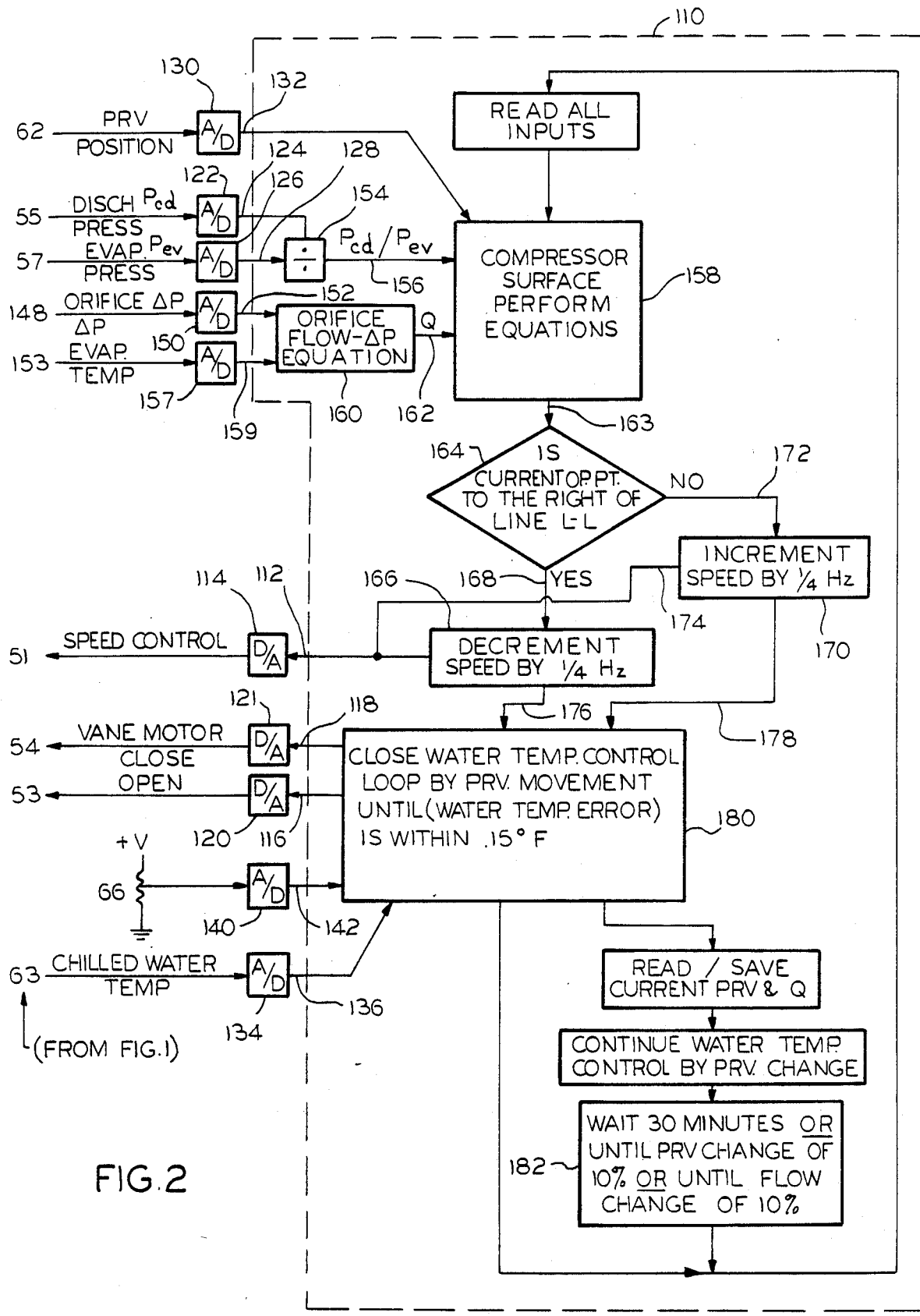
FIG. 2 is a more detailed diagram illustrating the microprocessor of FIG. 1 by way of a flow chart.

The details of the microprocessor 110 required to perform the function just described with respect to the operation of FIG. 3 is shown in FIG. 2 in a flow chart fashion. The microprocessor 110 includes a divider block 154 which receives the first input signal representative of the absolute condenser pressure from line 124 and the second input signal representative of the absolute evaporator pressure from line 128. The divider block 154 reproduces on its output line 156 a signal which is a ratio. A memory and calculator block 158 receives the ratio on line 156 which is indicative of the compressor head. The third input signal representative of the vane position on the line 132 is also received by the block 158.

The sixth input signal representative of the differential pressure across the orifice plate 148 from line 152 is received by a flow rate block 160. The other input to the block 160 is the seventh signal from line 159 representative of the temperature of the refrigerant vapor leaving the evaporator 28. From these two inputs, the block 160 produces an output signal on line 162 indicative of the suction flow rate which is also fed to the block 158. The block 158 is used to store surge surface equations as depicted in FIG. 3 and receives the input signals representative of the compressor head and suction flow rate measurements to calculate the current operating point such as the point A of FIG. 3. The output of the block 158 on line 163 is fed to a decision or logic block 164 to determine whether a current operating point is to the right of an applicable control line.

If the current operating point is found to be to the right of the control line, the compressor speed is incrementally decreased by speed block 166 via line 168. This output speed control signal on the line 112 from the block 166 is utilized to regulate the speed of the induction motor 36 via the D/A convertor 114 and the line 51. On the other hand, if the current operating point is found to be to the left of the control line, then the compressor speed is incrementally increased by speed block 170 via line 172. The output line 174 of the block 170 is fed also to the D/A converter 114 for regulating the speed of the induction motor 36.

A second output on 176 of the block 166 and a second output of 178 of the speed block 170 are input signals to a water temperature control block 180. A block 180 receives as additional inputs the fourth signal representative of the instantaneous load condition from line 136 and the fifth signal from line 142 representative of the desired condition. The block 180 is used to open, close or hold the position of the vanes so that an error between the chilled water temperature and the temperature set point is within point 0.15° F. The block 180 has two outputs, one being the "open vanes" control signal on line 116 and the other being the "close vanes" control signal on line 118. The vane control signals are used to regulate the PRV motor 32 via the lines 33. If the current operating point is determined to be to the left of control line L—L, a decision block 182 is utilized to delay further changes in the speed and PRV until after 30 minutes have passed, or the PRV or flow has changed by 10% of their previous values.

Figure 4:
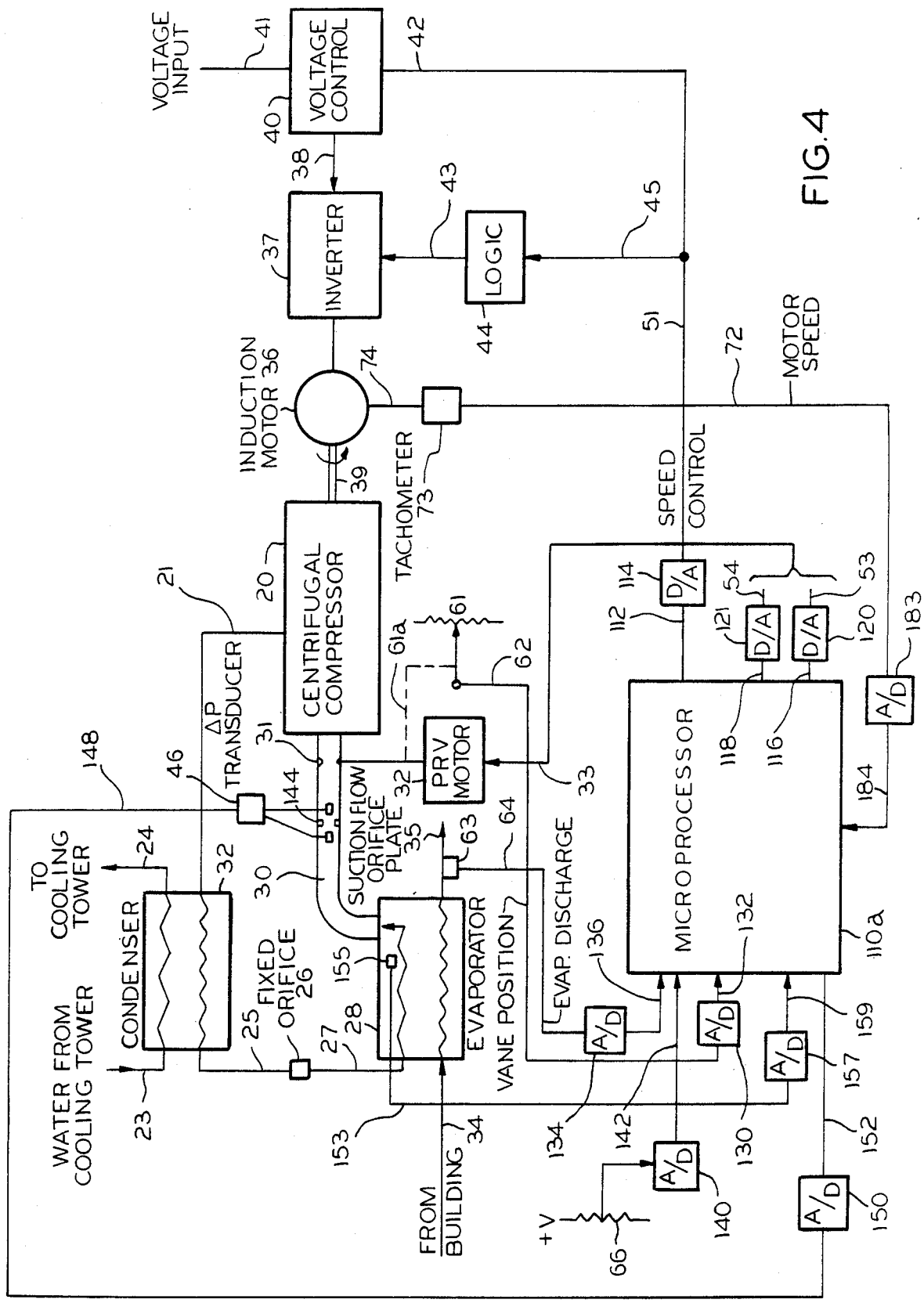
FIG. 4 is a block diagram of a second embodiment of a capacity control system of the present invention.

A second embodiment of a capacity control system of the present invention is illustrated in FIG. 4. All of the components and signals of FIG. 4 are identical to FIG. 1 except that a new input signal on line 72 representative of the actual motor speed of the inductor motor 36 replaces the first and second input signals on lines 55, 57 (FIG. 1) and their associated components 56, 58, 122 and 126. As can be seen, the motor speed signal is fed to A/D convertor 183 for driving a microprocessor 110a via line 184. It should be understood that the actual motor speed can be derived by a tachometer 73 connected to the motor 36 via a line 74. Since these are the only differences between FIG. 4 and FIG. 1, it is believed to be unnecessary to describe the remaining components and their interconnection as is shown in FIG. 4.

Figure 6:
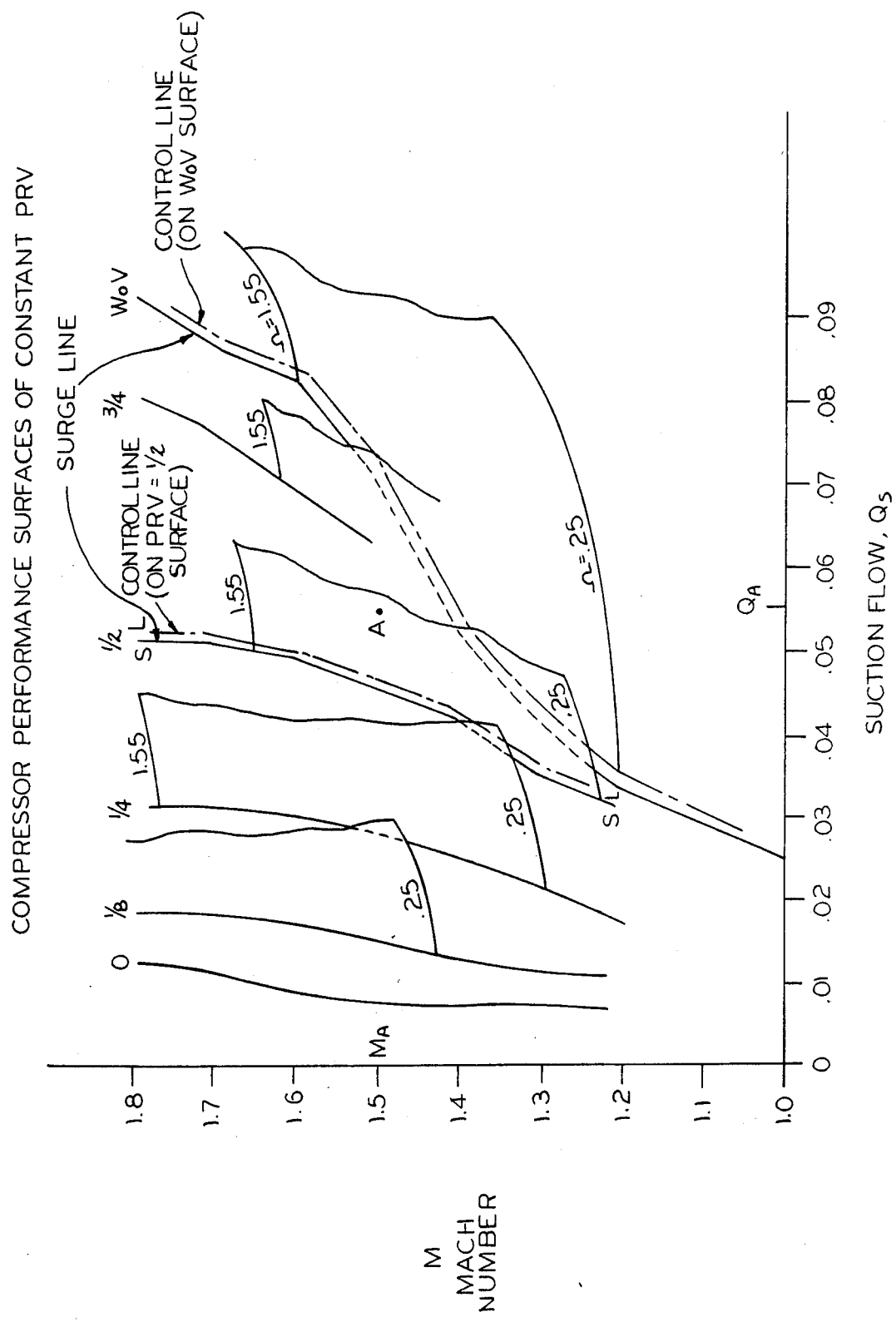
FIG. 6 is a graphical illustration useful in understanding the operation of the second embodiment shown in FIGS. 4 and 5.

Similarly, in order to provide an understanding of the operation of the second embodiment depicted in FIG. 4, reference is made now to FIG. 6 which illustrates graphically how surfaces of constant PRV settings appear on a chart where the compressor speed M referred to as Mach Number is plotted along the ordinate and the suction flow rate $Q_S$ is plotted along the abcissa. For example, if the compressor speed is equal to $M_A$, the suction flow rate is equal to $Q_A$, and the PRV are ½ open, there is defined a particular operating point A. Again, it must be remembered that a particular control line exists for each constant PRV surface. In the PRV equal ½ surface, the control line is designated as L—L. The microprocessor maintains in its memory the chart of FIGS. 6 as pre-stored surface equations and calculates from these input signals the current operating point and determines whether it is sufficiently away from the surge line S—S. In this illustration, the microprocessor 110a will determine that the operating point A is to the right of the control line L—L in FIG. 6. Thus, this would mean that a surge free operating point is feasible at a lower speed and a more open vane position.

Thus, the microprocessor when incrementally lower or decrease the compressor speed by ¼ hz and the chilled water temperature control loop is closed by moving of the PRV so that the error in the water temperature is within 0.15° F. The process of decreasing incrementally the speed would be continually repeated in the same manner as was previously described with respect to FIG. 3 so as to arrive at the optimum operating point.

Figure 5:
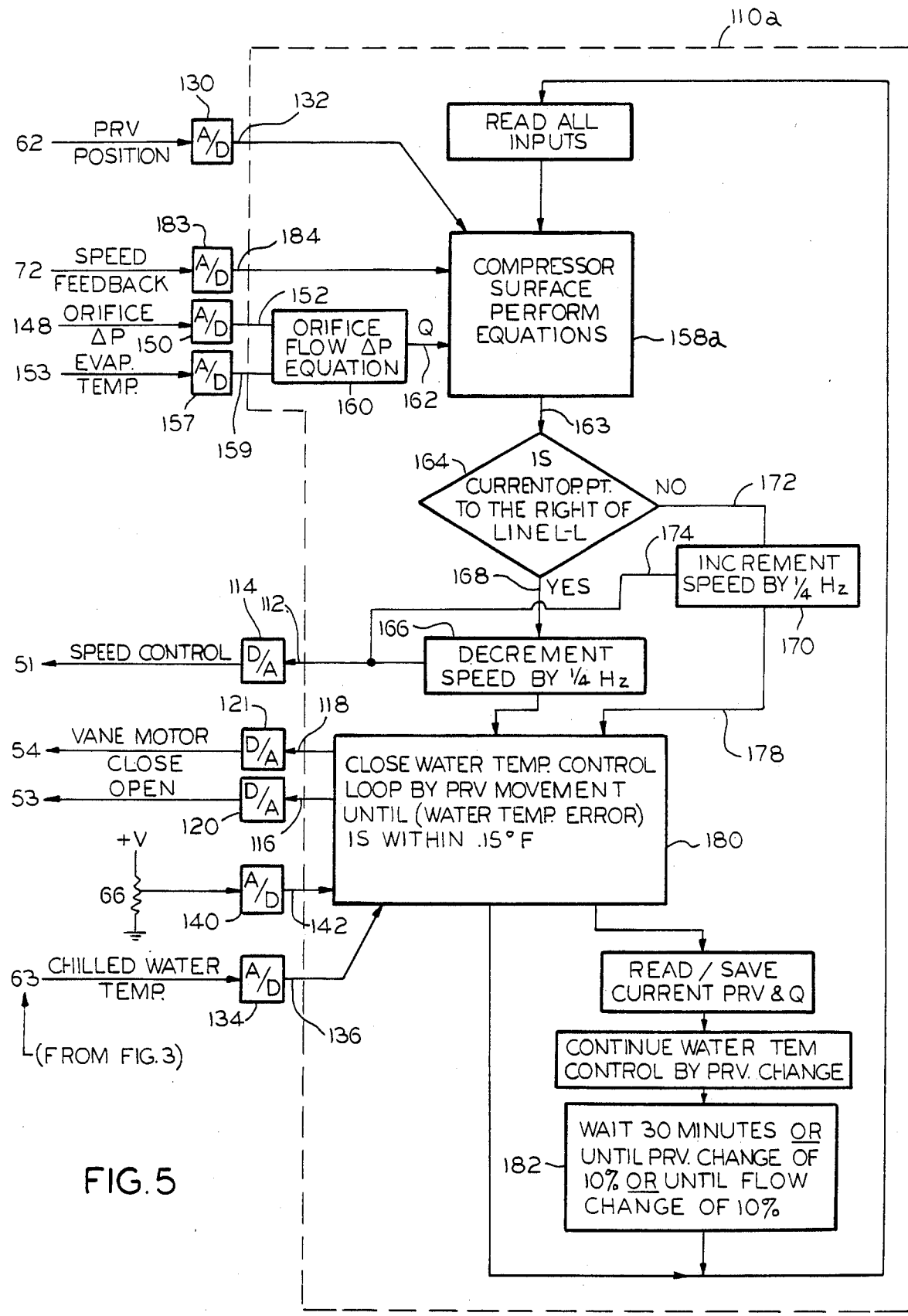
FIG. 5 is a more detailed diagram illustrating the microprocessor of the FIG. 4 by way of a flow chart.

The detail of the microprocessor 110a required to perform the function just described with respect to FIG. 6 is shown in FIG. 5 in a flow chart fashion. FIG. 5 is identical to FIG. 2 except that the motor speed signal on line 184 replaces the first and second signals on lines 124, 128 from FIG. 2. Thus, the motor speed signal is applied as an input to a memory and calculator block 158a which stores the surface equations as depicted on FIG. 6. Since these are the only differences between FIG. 5 and FIG. 2, it is believed unnecessary to describe the remaining components and their interconnection as illustrated in FIG. 5.

From the foregoing detailed description, it can thus be seen that the present invention provides an improved capacity control system for a refrigeration system which includes a microprocessor responsive to continual measurements of a PRV signal, a compressor head signal and a suction flow signal for generating control signals to adjust both the compressor speed and the inlet guide vanes position to an effective and efficient operating point but avoids a surge condition. Further, in a second embodiment, a microprocessor is responsive to the continual measurements of a PRV signal, a motor speed signal, and a suction flow signal in order to generate control signals to regulate both the speed of the compressor drive motor and the position of the inlet guide vanes.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to and more material to the teachings of the invention without departing from the central scope thereof. Therefore, it is intended that this invention not be limited to the particular embodiments disclosed as the best modes contemplated for carrying out this invention, but that the invention will include all embodiments falling within the scope of the appended claims.

What is claimed is:

1. A capacity control system for a refrigeration system including a compressor, a condenser, and an evaporator, all connected in a closed refrigeration circuit, which compressor includes a plurality of adjustable inlet guide vanes, a motor connected to regulate the inlet guide vanes position, and an electrical speed motor connected to drive the compressor, said control system comprising:
   means for sensing the absolute condenser pressure to generate a first signal;
   means for sensing the absolute evaporator pressure to generate a second signal;
   means for sensing the physical position of the inlet guide vanes to generate a third signal;
   means for sensing the temperature of the chilled water discharged from the evaporator to generate a fourth signal;
   means for sensing a temperature set point to generate a fifth signal;
   means for sensing the differential pressure across an orifice plate in a suction duct to generate a sixth signal;
   means for sensing the temperature of the refrigerant vapor leaving the evaporator to generate a seventh signal; and
   microprocessor means responsive to said first through seventh signals to generate control signals to regulate both the speed of the compressor drive motor and the position of the inlet guide vanes in an energy-conservation manner while avoiding surge.

2. A capacity control system as claimed in claim 1, wherein said condenser pressure sensing means comprises a first pressure transducer.

3. A capacity control system as claimed in claim 1, wherein said evaporator pressure sensing means comprises a second pressure transducer.

4. A capacity control system as claimed in claim 1, wherein said inlet guide vanes sensing means comprises a potentiometer having a movable arm mechanically coupled to the shaft of the vanes position motor.

5. A capacity control system as claimed in claim 1, wherein said chilled water discharge temperature sensing means comprises a first thermistor.

6. A capacity control system as claimed in claim 1, wherein said differential pressure sensing means comprises a differential pressure transducer.

7. A capacity control system as claimed in claim 1 wherein said evaporator sensing means comprises a second thermistor.

8. A capacity control system as claimed in claim 1, wherein said microprocessor means in response to said first through seventh signals calculates both the compressor speed and the position of the inlet guide vane to define a current operating point.

9. A capacity control system as claimed in claim 8, wherein said microprocessor means includes means for determining whether the current operating point is sufficiently away from surge, said microprocessor means further including means for reducing the system capacity by decreasing incrementally the compressor motor speed and opening more of the vanes if the current operating point is away from surge to define a second operating point, said microprocessor means determining whether said second operating point is sufficiently away from surge.

10. A capacity control system as claimed in claim 9, wherein said microprocessor means includes means for continually decreasing incrementally the compressor drive motor speed and opening more of the vanes until the operating point is found to be in the surge area, said microprocessor means subsequently increasing incrementally and closing more of the vanes to reach an operating point which is away from surge.

11. A capacity control system for a refrigeration system including a compressor, a condenser, and an evaporator all connected in a closed refrigeration circuit, which compressor includes a plurality of adjustable inlet guide vanes, a motor connected to regulate the inlet guide vanes position, and an electrical speed motor connected to drive the compressor, said control system comprising:
  means for sensing the actual speed of the compressor drive motor to generate a first signal;
  means for sensing the physical position of the inlet guide vanes to generate a second signal;
  means for sensing the temperature of the chilled water discharged from the evaporator to generate a third signal;
  means for sensing a temperature set point to generate a fourth signal;
  means for sensing the differential pressure across an orifice plate in a suction duct to generate a fifth signal;
  means for sensing a temperature of the refrigerant leaving the evaporator to generate a sixth signal; and
  microprocessor means responsive to said first through sixth signals for generating control signals to regulate both the speed of the compressor drive motor and the position of the inlet guide vanes in an energy-conservation manner while avoiding surge.

12. A capacity control system as claimed in claim 11, wherein said speed motor sensing means comprises a tachometer.

13. A capacity control system as claimed in claim 11, wherein said inlet guide vane sensing means comprises a potentiometer having a movable arm mechanically coupled to the shaft of the vanes position motor.

14. A capacity control system as claimed in claim 11, wherein said differential pressure sensing means comprises a differential pressure transducer.

15. A capacity control system as claimed in claim 11, wherein said microprocessor means in response to said first through sixth signals calculates both the compressor speed and the position of the inlet guide vanes to define a current operating point.

16. A capacity control system as claimed in claim 15, wherein said microprocessor means includes means for determining whether the current operating point is sufficiently away from surge, said microprocessor means further including means for reducing the system capacity by decreasing incrementally the compressor drive motor speed and opening more of the vanes of the current operating point is away from surge to define a second operating point, said microprocessor means determining whether said second operating point is sufficiently away from surge.

17. A capacity control system as claimed in claim 16, wherein said microprocessor means includes means for continually decreasing incrementally the compressor drive motor speed and opening more of the vanes until the operating point is found to be in the surge area, said microprocessor means subsequently increasing incrementally the compressor drive motor speed and closing more of the vanes to reach an operating point which is away from surge.

18. A capacity control system for refrigeration system including a compressor, a condenser, and an evaporator, all connected in a closed refrigeration circuit, which compressor includes a plurality of adjustable inlet guide vanes, a motor connected to regulate the inlet guide vanes position, and an electrical speed motor connected to drive the compressor, said control system comprising:
  means for generating a first signal which is a function of the ratio of the absolute condensor pressure and the absolute evaporator pressure to define a compressor head signal;
  means for generating a second signal which is a function of a differential pressure in the suction duct to define a suction flow rate signal; and
  microprocessor means responsive to said compressor head signal and said suction flow rate signal for generating control signals to adjust both the speed of the compressor speed drive motor and the position of the inlet guide vanes in an energy-conservation manner while avoiding surge.

19. A capacity control system as claimed in claim 18, wherein said microprocessor means in response to said compressor head signal and said suction flow rate signal calculates both the compressor speed and the position of the inlet guide vanes to define a current operating point.

20. A capacity control system as claimed in claim 19, wherein said microprocessor means causes the current operating point to move to a new operating point of a lower compressor speed and a more open PRV position if the current operating point is sufficiently away from surge.

* * * * *